United States Patent
Horner et al.

(10) Patent No.: US 8,808,072 B2
(45) Date of Patent: Aug. 19, 2014

(54) CABIN PRESSURE CONTROL SYSTEM DUAL VALVE CONTROL AND MONITORING ARCHITECTURE

(75) Inventors: Darrell W. Horner, Oro Valley, AZ (US); Joaquin P. Rabon, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1717 days.

(21) Appl. No.: 11/851,273

(22) Filed: Sep. 6, 2007

(65) Prior Publication Data

US 2008/0233854 A1 Sep. 25, 2008

Related U.S. Application Data

(60) Provisional application No. 60/896,433, filed on Mar. 22, 2007.

(51) Int. Cl.
*B64D 13/02* (2006.01)

(52) U.S. Cl.
USPC .......................................................... 454/74

(58) Field of Classification Search
USPC .................................. 454/6, 70, 74
See application file for complete search history.

(56) References Cited

U.S. PATENT DOCUMENTS

| | | | |
|---|---|---|---|
| 4,130,051 A * | 12/1978 | Brudnicki | 454/73 |
| 4,164,896 A * | 8/1979 | Aldrich | 454/72 |
| 4,164,899 A | 8/1979 | Burgess | |
| 4,499,914 A * | 2/1985 | Schebler | 137/81.1 |
| 5,334,090 A * | 8/1994 | Rix | 454/72 |
| 5,520,578 A | 5/1996 | Bloch et al. | |
| 6,737,988 B2 | 5/2004 | Horner et al. | |
| 6,746,322 B2 | 6/2004 | Scheerer et al. | |
| 8,155,876 B2 * | 4/2012 | White et al. | 701/300 |
| 2005/0022060 A1 * | 1/2005 | Hashimoto et al. | 714/37 |
| 2005/0153648 A1 * | 7/2005 | Horner et al. | 454/74 |
| 2006/0019594 A1 * | 1/2006 | Horner et al. | 454/74 |

FOREIGN PATENT DOCUMENTS

EP 1972551 A2 * 9/2008 ............. B64D 13/04

\* cited by examiner

*Primary Examiner* — Kang Hu
*Assistant Examiner* — Samantha Miller
(74) *Attorney, Agent, or Firm* — Shimokaji & Associates, P.C.

(57) ABSTRACT

The present invention provides a cabin pressure control system that comprises a first outflow valve having a first motor controlled by a first outflow valve controller, the first outflow valve having a first backup motor controlled by a first backup controller. A second outflow valve has a second motor controlled by a second outflow valve controller, the second outflow valve also having a second backup motor controlled by a second backup controller. Upon failure of the first outflow valve controller, the second outflow valve controller controls the first outflow valve via the first backup controller and the first backup motor; and upon failure of the second outflow valve controller, the first outflow valve controller controls the second outflow valve via the second backup controller and the second backup motor.

20 Claims, 4 Drawing Sheets

CABIN PRESSURE CONTROL SYSTEM DUAL VALVE CONTROL AND MONITORING ARCHITECTURE

CROSS REFERENCE TO RELATED APPLICATIONS

The present application claims the benefit of U.S. Provisional Patent Application No. 60/896,433, filed on Mar. 22, 2007.

BACKGROUND OF THE INVENTION

The present invention relates to cabin pressure control systems and, more particularly, to a cabin pressure control system having a dual valve control and monitoring architecture.

Aircraft cabin pressure control systems are necessary to maintain controlled cabin pressures when flying at high altitudes, where ambient air pressure is reduced. Above 10,000 feet ambient air pressure becomes low enough to cause passengers to suffer hypoxia, which is a deficiency of oxygen concentration in human tissue. The response to hypoxia may vary from person to person, but its effects generally include drowsiness, mental fatigue, headache, nausea, euphoria, and diminished mental capacity.

However, at altitudes above 10,000 feet, such as 43,000 feet and above, if the cabin pressure inside an aircraft were not permitted to decrease, the pressure difference between inside cabin pressure and outside ambient pressure can become sufficiently great to cause a catastrophic rupturing of the aircraft. Accordingly, it has been standard practice to permit cabin pressure to decrease to a value corresponding to an altitude of about 8,000 feet. Thus, structural integrity of the aircraft can be maintained while providing adequate oxygen for passenger breathing.

Large variations in cabin pressure can damage or destroy the aircraft fuselage. Variations in cabin pressure must also be controlled for the sake of passenger safety and comfort. Since the human ear is more sensitive to increases in pressure (descent in elevation) than to decreases in pressure (ascent in elevation), the passenger comfort factor is complicated by the need for different permissible maximum rate changes. Furthermore, for maximum passenger comfort the cabin pressure should not be subject to spikes or changes when the aircraft momentarily climbs or drops in altitude.

In general, electric cabin pressure control systems that meet these requirements include an outflow valve that controls the pressure differential between actual pressure in a cabin and the surrounding atmosphere. The outflow valve receives a drive signal from a controller and a driver. The controller calculates an output signal based on the pressure differential between the cabin and the atmosphere and additional critical parameters. This output signal actuates the outflow valve to keep the actual cabin pressure near a predetermined control cabin pressure.

A malfunction of the outflow valve or the controller may cause the pressure differential between the cabin pressure and the atmosphere pressure to exceed a predetermined threshold. In case of a positive pressure differential (cabin pressure higher than atmosphere pressure) a safety valve may open mechanically based on this pressure differential. Likewise, in the case of a malfunction that results in a negative pressure differential (cabin pressure lower than atmosphere pressure), a negative relief valve may allow entry of air into the cabin.

Because of the potential serious consequences of undesirable cabin pressure changes, current aircraft safety regulations require a high level of redundancy in cabin pressure control systems. Unfortunately, redundancy usually requires extra components such as outflow valves, control motors, and controllers, which add to the weight, space, installation costs and maintenance cost of cabin pressure control systems.

As can be seen, there is a need for an aircraft cabin pressure control system that is highly reliable, has adequate redundancy and which minimizes the added weight, space, installation cost and maintenance cost of the system.

SUMMARY OF THE INVENTION

In one aspect of the present invention, a cabin pressure control system comprises a first outflow valve having a first motor controlled by a first outflow valve controller, the first outflow valve having a first backup motor controlled by a first backup controller; a second outflow valve having a second motor controlled by a second outflow valve controller, the second outflow valve having a second backup motor controlled by a second backup controller; wherein upon failure of the first outflow valve controller, the second outflow valve controller controls the first outflow valve via the first backup controller and the first backup motor; and wherein upon failure of the second outflow valve controller, the first outflow valve controller controls the second outflow valve via the second backup controller and the second backup motor.

In another aspect of the present invention, a cabin pressure control system comprises a first outflow valve having a first motor controlled by a first outflow valve controller; a second outflow valve having a second motor controlled by a second outflow valve controller; a first backup motor for controlling the first outflow valve upon a fault in the first outflow valve controller and a second backup motor for controlling the second outflow valve upon a fault in the second outflow valve controller; and a semiautomatic controller for driving at least one of the first outflow valve and the second outflow valve upon a fault in both the first outflow valve controller and the second outflow valve controller and whereupon an override command is received from the pilot.

In accordance with a further aspect of the present invention, in a system for controlling a first and a second outflow valve, the system comprises a first outflow valve controller controlling the first outflow valve, the first outflow valve controller having a first controller functional segment that is monitored by a first monitoring function; a second outflow valve controller controlling the second outflow valve, the second outflow valve controller having a second controller functional segment that is monitored by a second monitoring function, wherein the second outflow valve controller controls the first outflow valve via a first backup motor upon shutdown of the first controller functional segment, and wherein the first outflow valve controller controls the second outflow valve via a second backup motor upon shutdown of the second controller functional segment; and wherein the first monitoring function shuts off the first controller functional segment if there is a fault in the first outflow valve controller and the second monitoring function shuts off the second controller functional segment if there is a fault in the second outflow valve controller.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be advantageously used in aircraft cabin pressure control systems where it is desirable to have a high level of redundancy, availability, and dissimilarity while minimizing weight, space, and costs.

Embodiments of the present invention may provide a cabin pressure control system having first and second outflow valves each having a motor and a backup motor. Each motor is controlled by an outflow valve controller and each backup motor is controlled by a backup controller. In the event of a failure of one outflow valve controller, each outflow valve controller is configured to control either outflow valve using the corresponding backup motor and backup controller. Prior art cabin pressure control systems did not use the outflow valve controller associated with one outflow valve to control another outflow valve using a backup motor in the event of a failure. In one embodiment of the invention, if both outflow valve controllers fail, a semiautomatic controller may drive both the outflow valves. Prior art aircraft cabin pressure control systems did not provide a semiautomatic controller to drive a plurality of outflow valves in the event that they both failed. In another embodiment of the invention, each outflow valve controller may include a monitoring function that monitors the outflow valve controllers and shuts down the outflow valve controller in the event of a fault condition. Prior art aircraft cabin pressure control systems did not include such monitoring functions.

Figure 1:
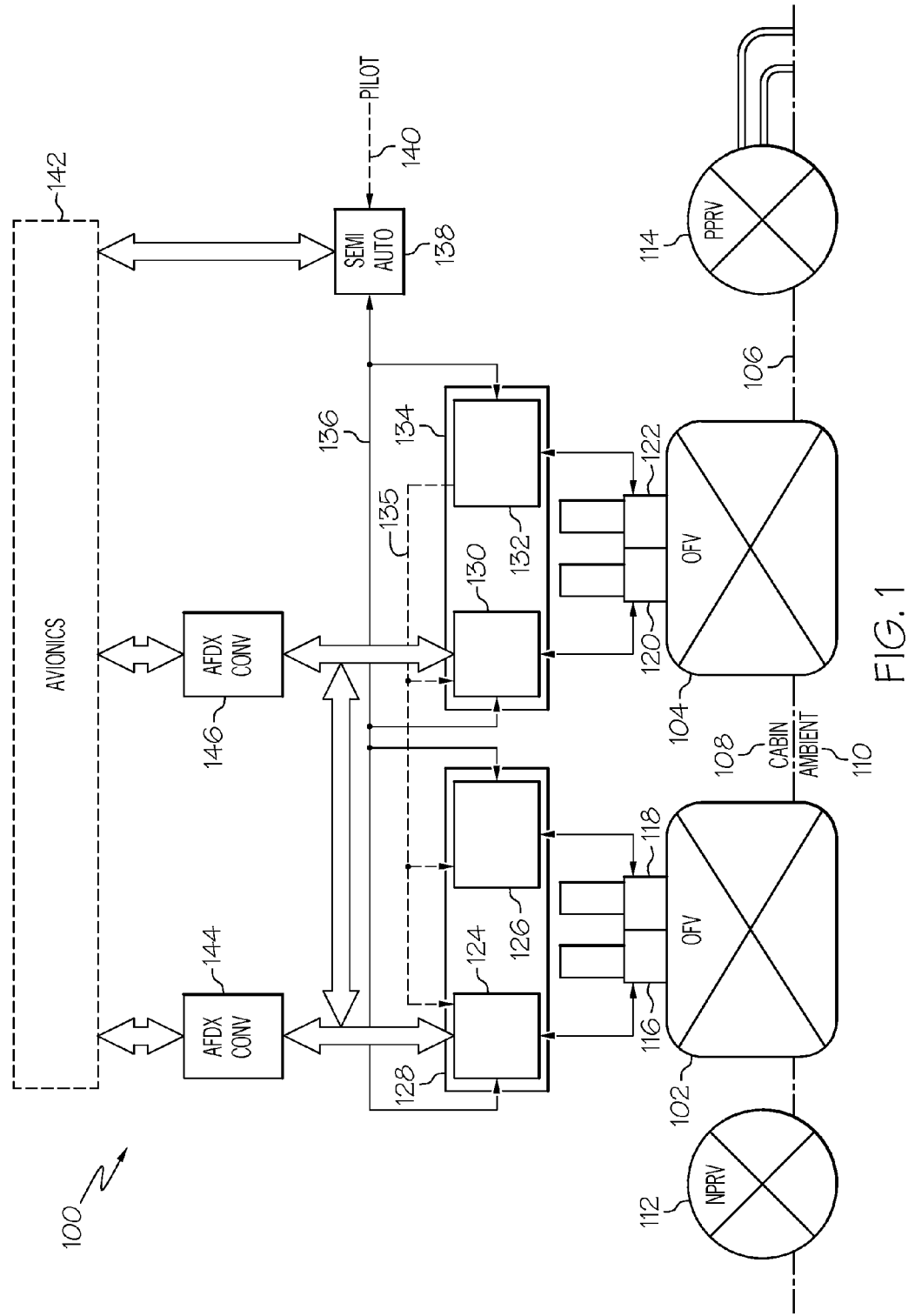
FIG. 1 is a block diagram of a cabin pressure control system in accordance with one embodiment of the present invention.

FIG. 1 shows a block diagram of a cabin pressure control system 100 which provides automatic cabin pressure control in accordance with one embodiment of the invention. First and second outflow valves 102 and 104 may be installed in an aircraft fuselage having a fuselage wall 106, which defines a border between the aircraft cabin air 108 and external ambient air 110. The first and second outflow valves 102, 104 may let air flow between the aircraft cabin 108 and the external ambient air 110 in a controlled manner. A negative pressure relief valve 112 may prevent the build up of an excessive negative pressure differential between the cabin and ambient air. A positive pressure relief valve 114 may prevent the build up of a positive pressure differential between the cabin and ambient air.

A first motor 116 and a first backup motor 118 may control the opening and closing of the first outflow valve 102. Likewise, a second motor 120 and a second backup motor 122 may control the opening and closing of the second outflow valve 104. The first motor 116 may be driven by a first outflow valve motor driver 124, while the first backup motor 118 may be driven by a first backup motor driver 126. Both the first outflow valve motor driver 124 and the first backup motor driver 126 may be part of a first outflow valve control unit 128.

Similarly, the second motor 120 may be driven by a second outflow valve motor driver 130, while the second backup motor 122 may be driven by a second backup motor driver 132. Both the second outflow valve motor driver 130 and the second backup motor driver 132 may be part of a second outflow valve control unit 134. In the event of a failure of the first outflow valve motor driver 124, the second outflow valve motor driver 130 may take over control of the first outflow valve 102 by means of commands sent through data bus 135 to the first backup motor driver 126.

Likewise, in the event of a failure of the second outflow valve motor driver 130, the first outflow valve motor driver 124 may take over control of the second outflow valve 104 by means of commands sent through data bus 135 to the second backup motor driver 132.

Also, if motor 116 fails, then backup motor 118 and backup motor controller 126 are used to control outflow valve 102 by commands sent through data bus 135 from outflow valve controller 130. Likewise, if motor 120 fails, then backup motor 122 and backup motor controller 132 are used to control outflow valve 104 by commands sent through data bus 135 from outflow valve controller 124.

In the event of a failure of both the first and second outflow valve motor drivers 124, 130, a semiautomatic controller 138 may control both the first and second outflow valves 102, 104 by means of commands sent through data bus 136 to the first and second backup motor drivers 126, 132. Semiautomatic controller 138 may also receive commands from a pilot through an input 140 or through an avionics system 142.

The first and second outflow valve control units 124, 130 may interface with the avionics system 142 through first and second avionics data converters 144, 146, which convert avionics full-duplex switched Ethernet (AFDX) (or similar format) data into ARINC 429 (or similar) data. These converters 144, 146, are advantageously used to simplify the design of the outflow valve controllers 124, 130, as these are part of larger systems which may already have this functionality. Or, outflow valve controllers 124 and 130 can receive AFDX (or similar) inputs directly from the avionics system 142, eliminating the functions of the data conversion units 144, 146.

Figure 2:
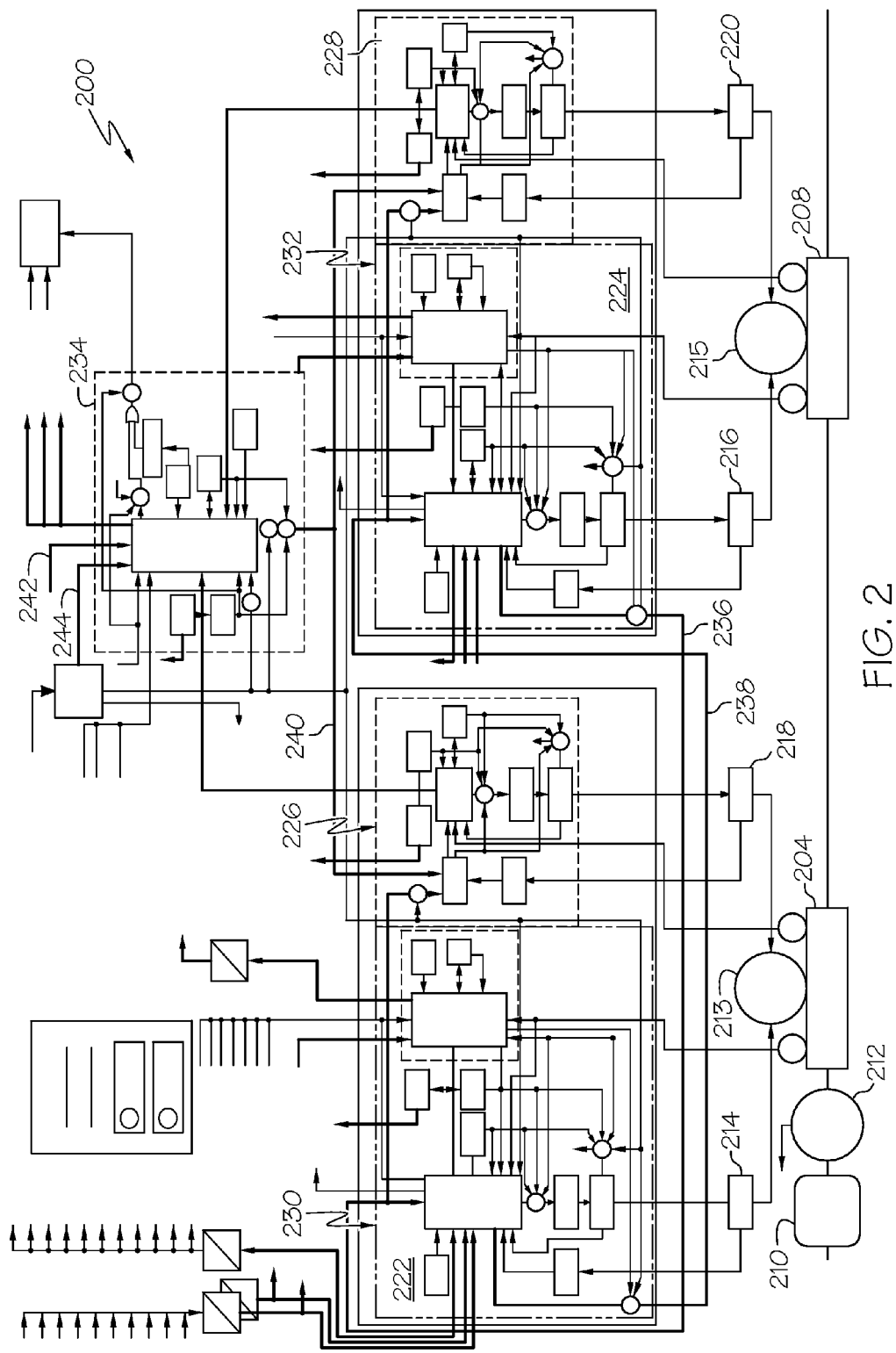
FIG. 2 is a block diagram showing additional details of the cabin pressure control system shown in FIG. 1 in accordance with one embodiment of the present invention.

FIG. 2 shows a cabin pressure control system 200 in accordance with another embodiment of the present invention. A first outflow valve control unit 230 may control a first outflow valve 204 disposed in the rear of the aircraft cabin, while a second outflow valve control unit 232 may control a second outflow valve 208 disposed in the front of the aircraft. The functions of the components in the cabin pressure control system 200 may be the same as the corresponding components as described in connection with FIG. 1. In particular, cabin pressure control system 200 may include: negative pressure relief valve 210; positive pressure relief valve 212; first and second motors 214, 216; first and second backup motors 218, 220; first and second outflow valve motor drivers 222, 224; first and second summing gearboxes 213, 215; first and second backup motor drivers 226, 228; first and second outflow valve control units 230, 232; and semiautomatic controller 234.

In the event of a failure of the first outflow valve motor driver 222, the second outflow valve motor driver 224 may take over control of the first outflow valve 204 by means of commands sent through data bus 236 to the first backup motor driver 226.

Likewise, in the event of a failure of the second outflow valve motor driver 224, the first outflow valve motor driver 222 may take over control of the second outflow valve 208 by means of commands sent through data bus 238 to the second backup motor driver 228. In the event of a failure of both the first and second outflow valve motor drivers 222, 224, the semiautomatic controller 234 will control both the first and second outflow valves 204, 208 by means of commands sent through data bus 240 to the first and second backup motor drivers 226, 228. Semiautomatic controller 234 may also receive commands from a pilot or from an avionics system through inputs 242 and 244.

Figure 3:
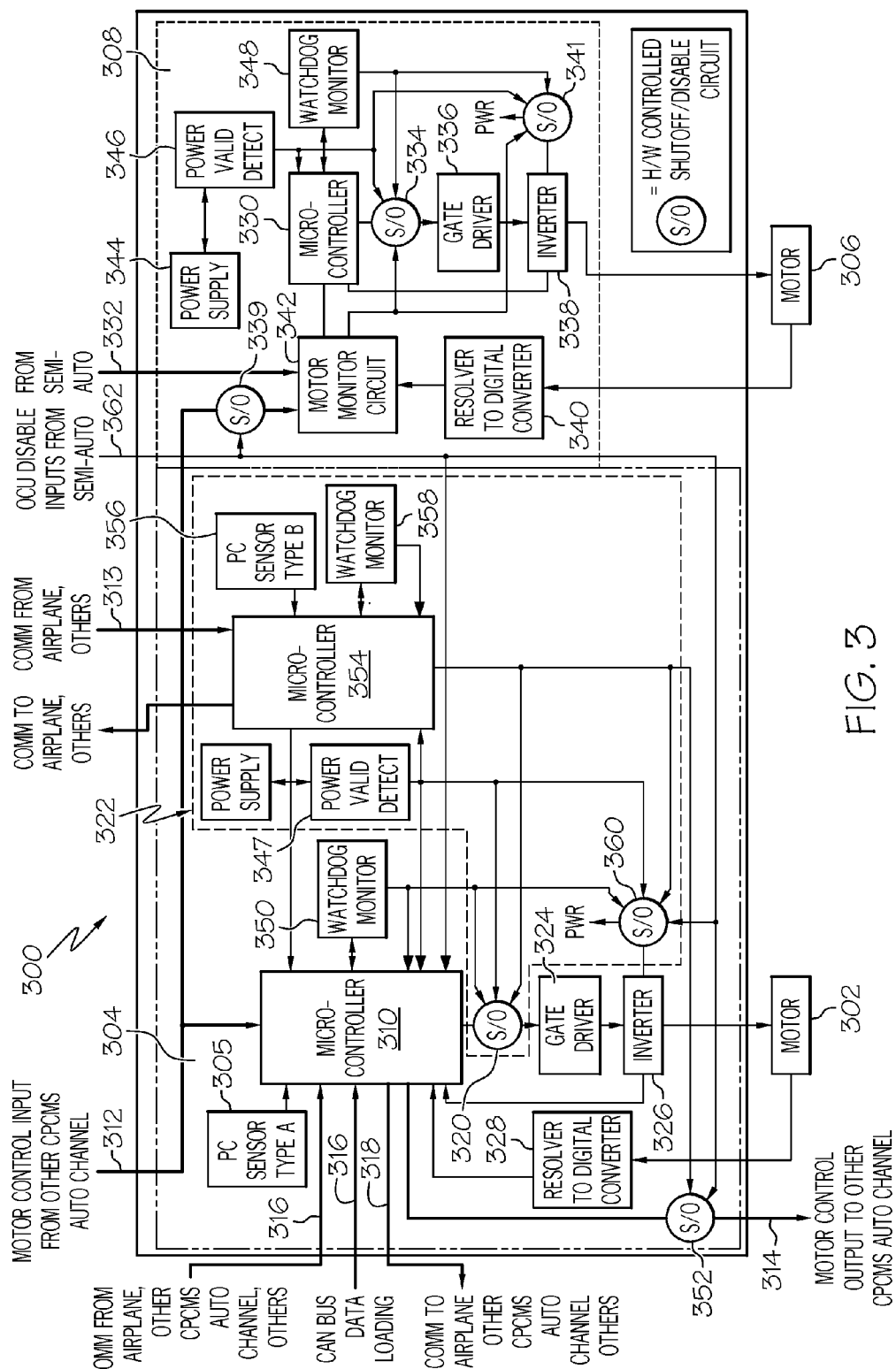
FIG. 3 is a block diagram of an outflow valve controller used in the cabin pressure control system shown in FIG. 1 in accordance with one embodiment of the present invention.

FIG. 3 shows additional details of an outflow valve controller 300 in accordance with one embodiment of the invention. A pair of similar outflow valve controllers 300 may be used to serve the function of the first and second outflow valve control units 230, 232 shown in FIG. 2. Outflow valve controller 300 may include an outflow valve motor 302 driven by an outflow valve motor driver 304 and a backup motor 306 driven by a backup motor driver 308. Both the outflow valve motor and the backup motor may drive an outflow valve (not shown) such as the first or the second outflow valves 204, 208 shown in FIG. 2.

Outflow valve motor driver 304 may include a microcontroller 310, which may receive motor control inputs from the other outflow valve controller (not shown) through data bus 312 and may send motor control outputs to the other outflow valve controller (not shown) through data bus 314. Microcontroller 310 may also receive and send commands to other aircraft systems through input 316 and output 318. The microcontroller 310 may control outflow valve motor 302 by signals sent through a hardware controlled shutoff/disable circuit 320, which may receive signals from a monitor circuit 322, which is described in more detail below. When not shut off by the shutoff/disable circuit 320, the microcontroller, 310, may send a signal to a gate driver 324, which may drive an inverter 326, which may in turn send control signals to the motor 302.

A resolver (not shown) on motor 302 may send signals to a resolver-to-digital converter 328, which performs the function of reporting the motor position, speed, and direction. Microprocessor 310 may receive the resolver-to-digital 328 output and use it to perform the motor control functionality.

As it is not the focus of this invention, other motor control techniques may be employed not using a resolver on the motor or a resolver-to-digital converter. These methods may employ hall-effect sensor feedback, "sensorless" current feedback, and possibly performing "open-loop" motor control, such as described in U.S. Pat. No. 6,979,257, as long as cabin pressure control can be performed using the motor control technique.

The backup motor driver 308 may generally be controlled by a microcontroller 330, which may be a digital signal processor (DSP). Microcontroller 330 may receive commands from the other outflow valve controller 300 (not shown) through bus 312 in the event of a failure of the outflow valve motor driver 304. Microcontroller 330 may comprise a DSP or microcontroller, or various other types of motor controllers in accordance with various embodiments of this invention. However, it is noted that in accordance with this invention the backup motor controller, 308, may be completely separated and dis-similar from the primary motor controller, 304, including power and data sources, so that a failure that affects the primary motor controller 304 does not adversely affect the backup motor controller 308. Also, microcontroller 330 may receive commands through bus 332 from a semiautomatic controller, such as semiautomatic controller 234 shown in FIG. 2, in the event of the failure of both the outflow valve controllers 304. Microcontroller 330 sends control signals to the backup motor 306 through shutoff/disable circuit 334, gate driver 336, and inverter 338.

Shutoff/disable circuits 339 and 341 as well as shutoff/disable circuit 334 may permit the monitor functions of the outflow valve controller 300 to disable the command functions in the event of erroneous behavior by the command functions as described in more detail below.

A resolver-to-digital converter 340 may perform a similar function as resolver-to-digital converter 328 described above, receiving signals from a resolver on the backup motor 306. Resolver-to-digital converter 340 sends an output signal to a motor monitor circuit 342, which compares the backup motor driver commanded direction from either bus 312 or bus 332 with the actual backup motor direction and shuts off the backup motor driver through shutoff/disable circuits 334 and 341 in the event that a mismatch is detected.

In accordance with this invention that the motor monitor circuit 342 may be separate and dis-similar from the microcontroller circuit 330 so that a failure of the microcontroller can be detected using the motor monitor circuit. The motor monitor circuit 342 may be implemented using a programmable logic device, a separate and dis-similar micro-controller (relative to the DSP/microcontroller 330), or a discrete circuit that can perform this function.

Also it should be noted that in accordance with the present invention the backup motor control 308 is separately powered from the primary motor control 304. A power supply 344 supplies power to the backup motor driver 308 through a power valid detect circuit 346, which prevents the digital signal processor 330 from operating and shuts off the gate driver 336 and the inverter output 338 using shutoff/disable circuits 334 and 341 respectively if the circuit detects that the power is not valid.

On the primary motor control unit 304, watchdog monitor unit 350 may perform the function of resetting the microcontroller 310 and disabling the gate driver 324, the inverter 326, and the output data bus 314, using shutoff/disable circuits 320, 360, and 352, if the watchdog circuit detects that the microcontroller is not properly executing software commands.

On the backup motor control unit 308, watchdog monitor unit 348 may perform the function of resetting the microcontroller 330 and shutting off the gate driver 336 and inverter 338, using shutoff/disable circuits 334 and 341, if the watchdog circuit detects that the digital signal processor is not properly executing software commands.

Monitor circuit 322 may have as its primary purpose to prevent erroneous behavior of the command function of the primary outflow valve controller 300 from creating an undesired effect on cabin pressure. The monitor circuit 322 may do this by shutting off the command portions of the outflow valve controller 304. In particular, microcontroller 354 detects erroneous behavior of the command function through inputs from sensor 356 and from aircraft data through bus input 313. In response to sensed erroneous behavior the microcontroller 354 may send a signal to one or more shutoff/disable circuits 352, 360 and/or 320. It is noted that monitor circuit 322 may act as a passive shutoff of the command functions when anomalous behavior is detected, but may not create command signals of its own.

One of the advantages of the present invention is that the cabin pressure sensor 305 may be completely separated and of a dis-similar design from cabin pressure sensor 356 so that a common mode sensor error or defect will not prevent the monitor circuit 322 from disabling an improperly functioning control 304. Likewise, the microcontroller circuit 310 is a separate and dis-similar design from the monitor microcontroller 354 so that a common mode microcontroller error or defect will not prevent the monitor circuit 322 from disabling an improperly functioning control 304.

Figure 4:
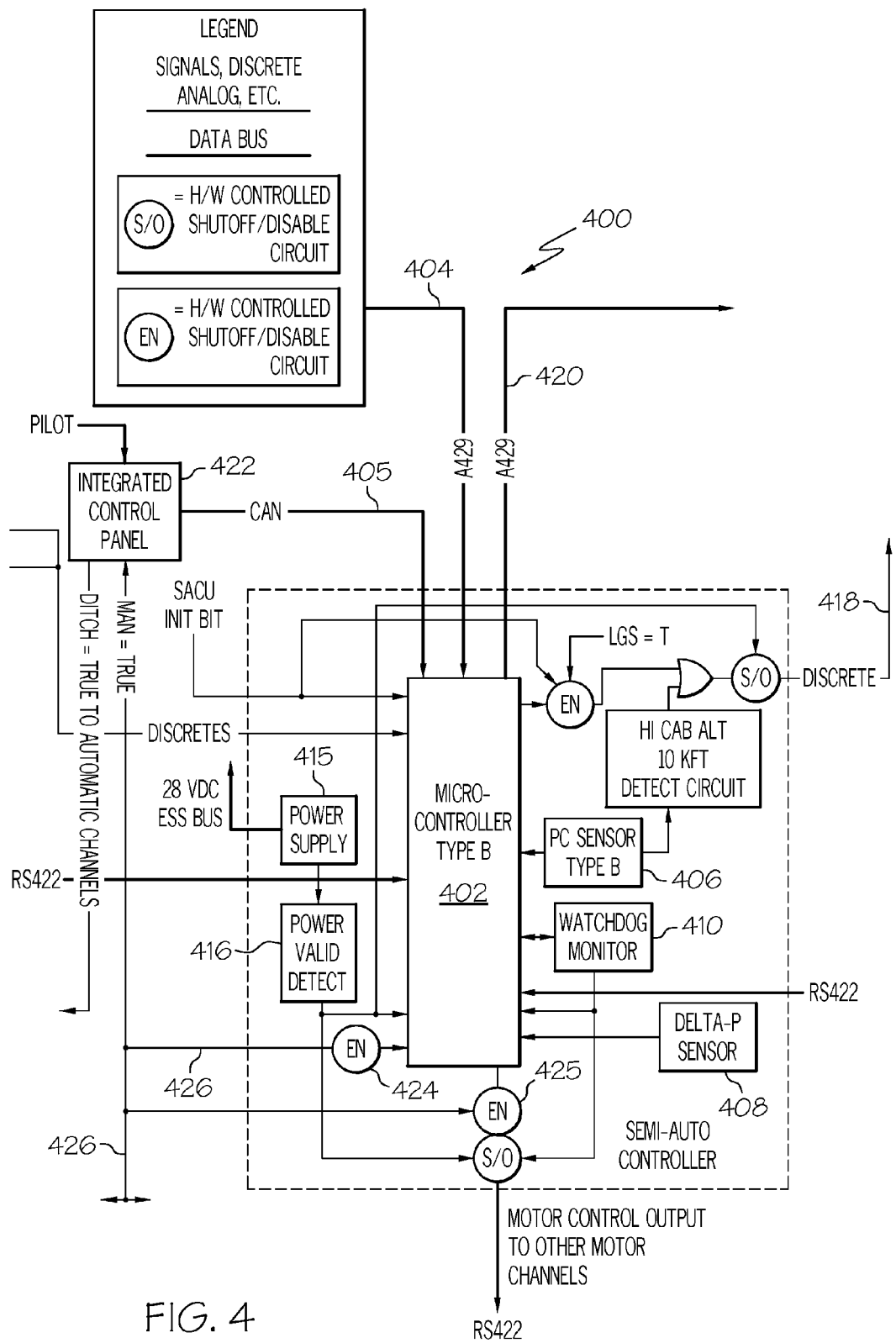
FIG. 4 is a block diagram of the semiautomatic controller used in the cabin pressure control system shown in FIG. 1 in accordance with one embodiment of the present invention.

FIG. 4 shows a semiautomatic controller circuit 400 in accordance with one embodiment of the invention that may be used for the semiautomatic controller circuit 234 shown in FIG. 2. As described above, the primary purpose of the semiautomatic controller circuit 400 may be to control both the first and second outflow valves 204, 208 by means of commands sent through data bus 240 to the first and second backup motor drivers 226, 228 in the event of a failure of both the first and second outflow valve motor drivers 222, 224. Semiautomatic controller 400 may also receive commands from a pilot or from an avionics system through inputs 404 and 405. The secondary purpose of the semi-automatic control is to provide cabin pressure sensor outputs from the cabin pressure sensor 406 and differential pressure sensor 408 via discrete signals 418 and a data bus 420.

Referring to both FIGS. 3 and 4, semiautomatic controller may include a microcontroller 402, a power supply 415, a cabin pressure sensor 406, and a differential pressure sensor 408. Differential pressure sensor 408 senses the cabin pressure minus the atmosphere pressure. It is noted that the semiautomatic controller 400 function may not be enabled for outflow valve motor control until the pilot enables it using an integrated control panel 422 and discrete signal 426 that is routed to the semi-automatic control unit 400 and the outflow valve control units 300. When the pilot enables the semiautomatic controller 400, enable circuits 424 and 425 may be enabled by the true signal 426 and allow outputs from the semi-automatic controller to be transmitted to the backup motor controllers 308 on both valves on data bus 332. Further, because signal 426 (or signal 362 in FIG. 3) is set to true the integrated control panel 422 semi-automatic mode selection may shut off data bus 312 inputs to the backup motor controllers 308 using shutoff/disable circuit 339, and therefore enables semi-automatic data bus inputs 332 (or input 136 in FIG. 1) to be used by the backup motor controller 308. Also, by the pilot setting the discrete signal 426/362 to true primary motor controller 304 may be disabled from outputting motor commands from data bus 314 by first sending the true 362 signal to microcontroller 310 and secondly using shutoff/disable circuits 352, 360 to shutdown any possibly erroneous command signals on data bus 314 that might result from microcontroller 310 not shutting off even after receiving a true 362 signal. and to shutdown any possible erroneous motor command signals from inverter 326.

Thus, it may be seen that the present invention may provide a cabin pressure control system with redundant controls for two outflow valves in the event of failure of one of the outflow valve controllers. A semiautomatic controller may control the outflow valves in the event of a failure of both the outflow valve controllers. Separate and dissimilar monitoring functions can respond to erroneous motor control behavior to prevent undesirable effects on cabin pressure. With high levels of redundancy and dissimilarity in its architecture, the present invention can perform the cabin pressure protective functions with only one positive and one negative pressure relief valves instead of two. Also, the architecture of the present invention may allow the cabin pressure control system to be implemented with fewer electronics and motors as compared to prior systems.

It should be understood, of course, that the foregoing relates to exemplary embodiments of the invention and that modifications may be made without departing from the spirit and scope of the invention as set forth in the following claims.

We claim:

1. A cabin pressure control system comprising:
a first outflow valve having a first primary motor controlled by a first outflow valve primary motor driver, said first outflow valve having a first backup motor controlled by a first backup motor driver;
a second outflow valve having a second primary motor controlled by a second outflow valve primary motor driver that is not the first outflow valve primary motor driver, said second outflow valve having a second backup motor controlled by a second backup motor driver;
wherein upon failure of said first outflow valve primary motor driver, but not the second outflow valve primary motor driver, said system is configured to control said first outflow valve via a sequential control path comprising said second outflow valve primary motor driver, said first backup motor driver, and said first backup motor; and
wherein upon failure of said second outflow valve primary motor driver, but not the first outflow valve primary motor driver, said system is configured to control said second outflow valve via a sequential control path comprising said first outflow valve primary motor driver, said second backup motor driver, and said second backup motor, whereby, upon failure of either of the outflow valve primary motor drivers, the first and second outflow valves are controlled through operation of at least one of the outflow valve primary motor drivers.

2. The cabin pressure control system of claim 1 further comprising a semiautomatic controller for driving at least one of said first outflow valve and said second outflow valve upon a fault in both said first outflow valve primary motor driver and said second outflow valve primary motor driver or upon an override command from the pilot.

3. The cabin pressure control system of claim 1 further comprising a first outflow valve controller wherein said first outflow valve controller includes a first controller functional segment and a first monitoring function, said first controller functional segment being monitored by said first monitoring function.

4. The cabin pressure control system of claim 3 wherein said first monitoring function shuts off said first controller functional segment if there is a fault in said first outflow valve controller.

5. The cabin pressure control system of claim 3 further comprising a second outflow valve controller wherein said second outflow valve controller includes a second controller functional segment and a second monitoring function, said second controller functional segment being monitored by said second monitoring function, wherein said first and second monitoring functions are independent and dis-similar.

6. The cabin pressure control system of claim 5 wherein said second monitoring function shuts off said second controller functional segment if there is a fault in said second outflow valve controller.

7. The cabin pressure control system of claim 1 wherein said first and second outflow valves are configured to permit air to pass between an aircraft cabin and ambient air.

8. The cabin pressure control system of claim 1 further comprising a negative pressure relief valve coupled between said aircraft cabin and ambient air.

9. The cabin pressure control system of claim 1 further comprising a positive pressure relief valve coupled between said aircraft cabin and ambient air.

10. A cabin pressure control system comprising:
a first outflow valve having a first motor controlled by a first outflow valve controller;
a second outflow valve having a second motor controlled by a second outflow valve controller;
a first backup motor configured to control, responsively to commands from a functional primary motor driver of the second outflow valve, said first outflow valve upon a fault in said first outflow valve controller;
a second backup motor configured to control, responsively to commands from a functional primary motor driver of the first outflow valve, said second outflow valve upon a fault in said second outflow valve controller; and
a semiautomatic controller configured to drive at least one of said first outflow valve through the first backup motor and said second outflow valve through the second backup motor upon a fault in both said first outflow valve controller and said second outflow valve controller.

11. The cabin pressure control system of claim 10 wherein said first outflow valve controller includes a first controller functional segment and a first monitoring function, said first controller functional segment being monitored by said first monitoring function, wherein said first monitoring function shuts off said first controller functional segment if there is a fault in said first outflow valve controller.

12. The cabin pressure control system of claim 11 wherein said second outflow valve controller includes a second controller functional segment and a second monitoring function, said second controller functional segment being monitored by said second monitoring function, wherein said second monitoring function shuts off said second controller functional segment if there is a fault in said second outflow valve controller.

13. The cabin pressure control system of claim 11 wherein said first monitoring function includes a dissimilar microprocessor and a watchdog monitor circuit and a dissimilar sensor.

14. The cabin pressure control system of claim 12 wherein said second monitoring function includes a microprocessor and a watchdog monitor circuit and a dissimilar sensor.

15. A system for controlling a first and a second outflow valve, said system comprising:
a first outflow valve controller controlling said first outflow valve, said first outflow valve controller having a first controller functional segment that is monitored by a first monitoring function;
a first primary motor and a first backup motor connected to the first outflow valve controller;
a second outflow valve controller controlling said second outflow valve
a second primary motor and a second backup motor connected to the second outflow valve controller, said second outflow valve controller having a second controller functional segment that is monitored by a second monitoring function, wherein said second outflow valve controller is configured to control said first outflow valve via a driver for the second primary motor and the first backup motor upon shutdown of said first controller functional segment caused by failure of the first primary motor while said driver for the second primary motor continues to control the second primary motor, and wherein said first outflow valve controller is configured to control said second outflow valve via a driver for the first primary motor and the second backup motor upon shutdown of said second controller functional segment caused by failure of the second primary motor while said driver for the first primary motor continues to control the first primary motor; and
wherein said first monitoring function shuts off said first controller functional segment if there is a fault in said first outflow valve controller and said second monitoring function shuts off said second controller functional segment if there is a fault in said second outflow valve controller.

16. The system of claim 15 further comprising a controller having semiautomatic control capabilities for controlling at least one of said first and second backup motors upon fault in both said first and said second outflow valve controllers or upon an override command from the pilot.

17. The system of claim 15 further comprising first data bus connected between said first outflow valve controller and said second backup motor.

18. The system of claim 17 further comprising a second data bus connected between said second outflow valve controller and said first backup motor.

19. The system of claim 17 further comprising a data bus connecting said first and second outflow valve controllers to an aircraft avionics system, said data bus carrying command signals from a pilot.

20. The system of claim 16 further comprising a data bus connecting said semiautomatic controller to an aircraft avionics system, said data bus carrying command signals from a pilot.

* * * * *